(12) United States Patent
Ryu et al.

(10) Patent No.: US 6,521,380 B1
(45) Date of Patent: Feb. 18, 2003

(54) RECHARGEABLE LITHIUM BATTERY

(75) Inventors: Jae-Yul Ryu, Choongcheongnam-do (KR); Sang-Young Yoon, Choongcheongnam-do (KR); Wan-Uk Choi, Choongcheongnam-do (KR); Kyoo-Yoon Shim, Choongcheongnam-do (KR); Sang-Jim Kim, Choongcheongnam-do (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/430,253

(22) Filed: Oct. 29, 1999

(30) Foreign Application Priority Data

Feb. 9, 1999 (KR) .............................. 99-4666

(51) Int. Cl.[7] .............................. H01M 4/58; H01M 6/16
(52) U.S. Cl. .............................. 429/231.8; 429/218.1; 429/231.95; 429/324; 429/338
(58) Field of Search .............................. 429/218.1, 231.8, 429/231.9, 231.95, 324, 231.4, 338

(56) References Cited

U.S. PATENT DOCUMENTS 5,358,805 A * 10/1994 Fujimoto et al. ............ 429/218
5,698,341 A * 12/1997 Tamaki et al. ............... 429/218
5,753,387 A * 5/1998 Takami et al. ............... 429/194
6,040,092 A * 3/2000 Yamada et al. .............. 429/331
6,156,457 A * 12/2000 Takami et al. ........... 429/231.4

FOREIGN PATENT DOCUMENTS

| JP | 62-52861 | * | 3/1987 |
| JP | 11-97019 | * | 4/1999 |
| JP | 11-250910 | * | 9/1999 |

* cited by examiner

Primary Examiner—Patrick Ryan
Assistant Examiner—Julian Mercado
(74) Attorney, Agent, or Firm—Blakely Sokoloff Taylor & Zafman

(57) ABSTRACT

A rechargeable lithium battery includes a negative electrode with a graphite-based active material with boron as a donor and a positive electrode with a transition metal oxide-based active material. A separator is interposed between the negative and positive electrodes. The positive and negative electrodes and the separator are all saturated with an electrolyte. The electrolyte contains cyclic carbonate and chain carbonate at a ratio of 51:49 by volume percent.

6 Claims, 2 Drawing Sheets

RECHARGEABLE LITHIUM BATTERY

BACKGROUND OF THE INVENTION (a) Field of the Invention

The present invention relates to a rechargeable lithium battery and, more particularly, to a rechargeable lithium battery having good performance characteristics.

(b) Description of the Related Art

Generally, when transition metal oxides are employed for use in the positive electrode of rechargeable lithium batteries, carbon-based materials are among the best choice of active materials for the negative electrode. Owing to the use of the carbon-based active materials, the potential safety problem present in metallic lithium-based batteries can be prevented while achieving a relatively higher energy density as well as the reasonable shelf life.

The carbon-based materials can be largely classified into two categories of crystalline graphite and amorphous carbon. Crystalline graphite has a wider electrochemical voltage window and a higher energy density than amorphous carbon. For this reason, crystalline graphite is more frequently used for the negative electrode as the active material. Crystalline graphite having the desired specific properties such as density and interlayer spacing can be prepared by controlling the temperature of the heat treatment. Alternatively, doping with boron as catalyst may increase the capacity of coke type materials to a suitable degree. Several attempts are made to increase the catalyst content to be contained in the resulting graphite structure as it is conceived that the catalyst content acts as a critical factor for obtaining the desired crystalline structure.

The choice of electrolyte solvents is critical for the battery performance characteristics. When propylene carbonate is employed for the electrolyte solvent use, the graphite-based negative active material is liable to excessively react with propylene carbonate. Therefore, the available candidates of electrolyte solvents for ensuring a relatively stable reaction will be ethylene carbonate, dimethyl carbonate, ethyl methyl carbonate and diethyl carbonate. Among them, ethylene carbonate is usually recommended as the electrolyte solvent as it ensures a reasonable cycle life of the battery. In addition to the advantage, ethylene carbonate also has a disadvantage in that as its content increases, the freezing point of the electrolyte is elevated. This is due to the fact that ethylene carbonate has a relatively higher melting point exceeding the ambient temperature.

In order to solve such problems, it can be conceived that ethylene carbonate is replaced by propylene carbonate while preventing its excessive reaction with the graphite-based active material. This is performed by doping boron to the graphite-based active material. However, even in boron-doped active material, propylene carbonate may induce the aforementioned problem because the active material preparing process does not adequately performed. For example, in the active material preparing process, when boron is coated on the host material and heat-treated at high temperatures under an air atmosphere, boron reacts with nitrogen contained in air to thereby form boron nitride or is liable to be volatilized. In these cases, the desired properties of the resulting electrolyte can not be expected.

SUMMARY OF THE INVENTION

It is an object of the present invention to provide a rechargeable lithium battery which has good performance characteristics such as shelf life, capacity and charge and discharge efficiency.

It is another object of the present invention to provide a rechargeable lithium battery which can use propylene carbonate as an electrolyte solvent without any dropping of battery performance characteristics.

These and other objects may be achieved by a rechargeable lithium battery having a negative electrode with a graphite-based active material with boron as a donor and a positive electrode with a transition metal oxide-based active material. A separator is interposed between the negative and positive electrodes. The positive and negative electrodes and the separator are all saturated with an electrolyte. The electrolyte contains at least 51 percent by volume of cyclic carbonate and chain carbonate of 49 percent by volume.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
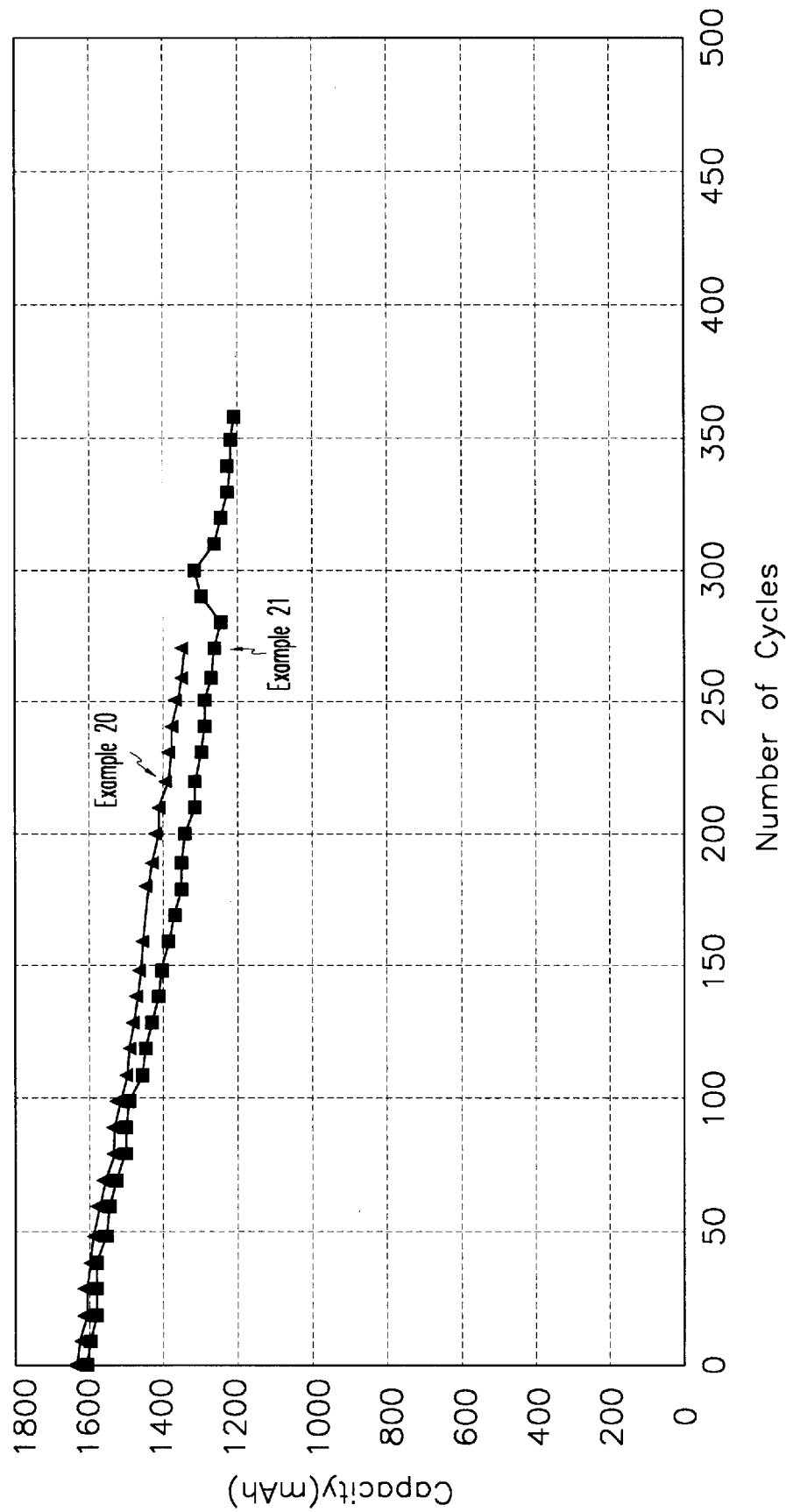
FIG. 1 is a graph illustrating decrease in battery capacity during charge and discharge cycles of rechargeable lithium batteries according to some examples of the present invention.

The rechargeable lithium battery according to the present invention is provided with a negative electrode containing a graphite-based active material. Boron is incorporated into the graphite-based active material as a donor. Transition metal oxide is used for the positive electrode as an active material. A separator is interposed between the positive and negative electrodes to separate them from each other. The positive and negative electrodes as well as the separator are all saturated with an electrolyte. Chain carbonate and cyclic carbonate are used for the electrolyte as an organic solvent and lithium salt is dissolved in the organic solvent as an electrolyte component. The chain carbonate content in the electrolyte is at least 51 percent by volume.

The boron content incorporated in the graphite-based active material is ranged from 0.1 to 5 weight percent and the boron source material is selected from $B_4C$, $B_2O_3$ or $H_3BO_3$. An X-ray diffraction intensity ratio of (110) plane to (002) plane of the boron doped graphite-based active material is 0.04 or less. Furthermore, the boron doped graphite-based active material is formed with a core having a crystalline-graphitic structure and a carbon surface having a turbo-stratic structure. A Raman Spectroscopy intensity ratio I(1360)/I(1580) of the core is 0.3 or less and the corresponding intensity ratio of the carbon surface is 0.2 or less. The turbo-stratic structure is characterized by a quasi-amorphous state and a more or less disordered orientation due to a radically low crystallization degree and a tiny crystalline size. This turbo-stratic structure is present in the carbon surface area surrounding the core of the negative electrode active material. When heat rise and fall versus time is analyzed with respect to the negative electrode active material having such a double structured form, an exothermic-peak of the negative electrode active material turns out to be placed at about 900° C. or more.

Particularly, owing to the turbo-stratic structure present in the carbon surface area of the negative electrode active material, it becomes possible to use propylene carbonate for the organic electrolyte solvent, which could not be conventionally used in the rechargeable lithium batteries having a graphite-based negative electrode. The turbo-stratic structured carbon surface area makes it possible to reduce reaction rate of the electrode material with propylene carbonate for the electrolyte solvent.

In addition to propylene carbonate (PC), the organic solvent for the electrolyte can be selected from ethylene carbonate (EC) being the cyclic carbonate component together with PC or a mixture of EC and PC, and chain carbonate such as dimethyl carbonate (DMC), ethyl methyl carbonate (EMC), diethyl carbonate (DEC) or a mixture thereof. Lithium salt such as $LiPF_6$, $LiBF_4$, $LiAsF_6$ or a mixture thereof is dissolved in the organic solvent to act as the electrolyte component.

A process of preparing the negative electrode active material identified above is performed in the following way.

A boron-based compound is dissolved in water, organic solvent or a mixture thereof to obtain a boron-based compound solution. The boron-based compound can be selected from $B_4C$, $B_2O_3$ or $B_2O_3$. The organic solvent can be selected from any solvent material capable of solving the boron-based compound. For example, ethanol, methanol or isopropyl alcohol can be employed for the organic solvent use.

A carbonaceous material such as coke or mesophase pitch-based carbon fiber is mixed with the boron-based compound solution to make a mixed solution. The mixed solution is then processed by using a spray-dryer or an agglomaster such that the boron-based compound can be uniformly coated on the surface of the carbonaceous material. Thereafter, the carbonaceous material coated with the boron-based compound is graphitized at temperatures ranging from 2000° C. to 3000° C. for 2 to 20 hours under an argon or air atmosphere to thereby obtain the desired negative electrode active material.

Furthermore, the negative electrode material may be also prepared in the following way.

A boron-based compound is mixed with pitch. The mixture is heat-treated at about 450° C. to obtain a coke type material. Alternatively, a boron-based compound is first mixed with pitch or resin and the mixture is then uniformly re-mixed with pitch coke that is obtained by cocking pitch. The resulting material is carbonized at temperatures ranging from 1000° C. to 1700° C. The carbonized material is then graphitized at temperatures ranging from 2000° C. to 3000° C. to thereby obtain a boron-doped active material. Meanwhile, the processing steps of pulverizing and sieving the carbonaceous material may be introduced after or before the carbonizing step or the graphitizing step.

Conventionally, boron is coated on the host material and heat-treated at high temperature at high temperature under an air atmosphere such that boron reacts with nitrogen contained in air to thereby form boron nitride or is liable to be volatized. In these cases, the desired properties of the resulting electrolyte can not be expected. Whereas, in the present invention, boron should be heat-treated under an argon atmosphere or first coated with pitch or high-molecular resin and then process with subsequent processing steps. Accordingly, the present invention method can prevent the formation of boron nitride or volatility of boron.

In either way, the resulting negative electrode active material contains 0.1 to 5 weight percent of boron. When boron is present in the active material, it increases crystallization degree of the active material and acts as an electron acceptor to elevate kinetics of the active material, resulting in increased capacity of the battery. In addition, owing to the doping of boron, the surface structure of the active material is controlled such that edge planes of the host graphite component are not externally exposed. As a result, disintegrating reaction rate of the electrolyte is reduced and hence the charge and discharge efficiency becomes higher.

Furthermore, as described earlier, the turbo-stratic structure present in the surface area of the active material helps to reduce reaction rate of the graphite-based active material with the PC-based electrolyte. Accordingly, polyethylene carbonate (PC) can be effectively employed for the electrolyte solvent use without reducing the battery capacity.

In the rechargeable lithium battery according to the present invention, a usual polyethylene or polypropylene-typed porous film can be used for the separator. The positive electrode can be prepared through the steps of obtaining an active material slurry by dissolving $LiCoO_2$, $LiNiO_2$, $LiMnO_2$ or $LiMn_2O_4$ in N-methylpyrrolidone together with poly vinylidene fluoride for a binder, coating the active material slurry onto an aluminum foil for a positive current collector and drying it.

The following examples further illustrate the present invention.

EXAMPLE 1

A $B_2O_3$ solution was prepared by dissolving $B_2O_3$ in ethanol and water/isopropyl alcohol solvents. Oil coke powder was added into the $B_2O_3$ solution to make a mixed solution. The mixed solution was processed by using a spray-dryer such that $B_2O_3$ can be uniformly coated on the oil coke surface. Then, the resulting material was graphitized at about 2600° C. for two hours under an argon atmosphere to thereby prepare a boron-doped graphite material.

An active material slurry for the negative electrode was prepared by mixing the boron-doped graphite material identified above, polyvinylidene fluoride (PVDF) for a binder and N-methylpyrrolidone for a solvent. The weight percent ratio of the boron-doped graphite material to PVDF was 90 to 10. The slurry was coated onto a copper foil for a current collector, dried and pressed thereon to thereby prepare the negative electrode. A thin foil of metallic lithium was used as the opposite pole to the negative electrode. Three kinds of electrolytes were prepared by dissolving $LiPF_6$ in a mixture of ethylene carbonate (EC), dimethyl carbonate (DMC) and diethyl carbonate (DEC), a mixture of EC, ethyl methyl carbonate (EMC) and DEC, and a mixture of EC, DMC, DEC and propylene carbonate (PC). Coin-type half cells were fabricated with the above cell components.

EXAMPLES 2 to 9

The negative electrode preparing procedure was performed in the same way as in Example 1 with the exception that the quantity of $B_2O_3$, the equipment for coating $B_2O_3$ onto the carbonaceous material and the atmosphere varied as shown in Table 1. Coin-type half cells were fabricated with the resulting negative electrode in combination with other components as described in Example 1.

The coin-type half cells prepared according to Examples 1 to 9 were charged and discharged at 0.2C. Thereafter, the capacity and the charge/discharge efficiency of each cell was tested and evaluated. The results were exhibited in Table 1. The boron content was measured by ICP-Mass, and the surface-structure as well as the micro-structure of the negative electrode was identified by TEM, XPS, Raman Spectroscopy and XRD analysis.

TABLE 1

| | Coating Equipment | Quantity of $B_2O_3$ (wt %) | B content (wt %) | Atmosphere | Capacity (mAh/g)/ Charge and discharge efficiency | | |
|---|---|---|---|---|---|---|---|
| | | | | | EC/DMC/ DEC | EC/EMC/ DEC | EC/DMC/ DEC/PC |
| Example 1 | Spray-dryer | 2.2 | 0.57 | Ar | 346/92.3 | 344/92.6 | 345/93.0 |
| Example 2 | Spray-dryer | 4.4 | 1.1 | Ar | 338/93.7 | 336/93.5 | 339/93.8 |
| Example 3 | Agglo-master | 2.2 | 0.47 | Ar | 339/89.4 | 336/89.7 | 337/90.6 |
| Example 4 | Agglo-master | 2.2 | 0.45 | Air | 335/90.5 | 336/90.8 | 338/90.6 |
| Example 5 | Spray-dryer | 0.6 | 0.16 | Air | 317/94.6 | 320/94.5 | 620/93.8 |
| Example 6 | Spray-dryer | 1.1 | 0.23 | Air | 334/93.1 | 338/93.6 | 295/52 |
| Example 7 | Spray-dryer | 1.6 | 0.39 | Air | 335/92.2 | 336/92.3 | 280/55 |
| Example 8 | Spray-dryer | 2.2 | 0.55 | Air | 335/90.0 | 335/91.1 | 310/54 |
| Example 9 | Spray-dryer | 4.4 | 1.07 | Air | 337/86.2 | 336/87.2 | 250/48 |

EXAMPLE 10

The negative electrode preparing procedure was performed in the same way as in Example 1 with the exception that $B_2O_3$ was replaced by $H_3BO_3$ and the spray-dryer by an agglomaster. Coin-type half cells were fabricated with the resulting negative electrode in combination with other components as described in Example 1.

EXAMPLES 11 TO 14

The negative electrode preparing procedure was performed in the same way as in Example 10 with the exception that the quantity of $H_3BO_3$, the equipment for coating $H_3BO_3$ onto the carbonaceous material and the atmosphere varied as shown in Table 2. Coin-type half cells were fabricated with the resulting negative electrode in combination with other components as described in Example 1.

The coin-type half cells prepared according to Examples 10 to 14 were charged and discharged at 0.2C. Thereafter, the capacity and the charge/discharge efficiency of each cell was tested and evaluated. The results were exhibited in Table 2. The boron content was measured by ICP-Mass, and the surface-structure as well as the micro-structure of the negative electrode was identified by TEM, XPS, Raman Spectroscopy and XRD analysis.

EXAMPLES 15 AND 16

The negative electrode preparing procedure was performed in the same way as in Example 1 with the exception that oil coke was replaced by mesophase pitch carbon fiber and the quantity of $B_2O_3$ was differentiated in Example 15. Coin-type half cells were fabricated with the resulting negative electrode in combination with other components as described in Example 1.

The coin-type half cells prepared according to Examples 15 and 16 were charged and discharged at 0.2C. Thereafter, the capacity and the charge/discharge efficiency of each cell was tested and evaluated. The results were exhibited in Table 3. The boron content was measured by ICP-Mass, and the surface-structure as well as the micro-structure of the negative electrode was identified by TEM, XPS, Raman Spectroscopy and XRD analysis.

TABLE 2

| | Coating Equipment | Quantity of $B_2O_3$ (wt %) | B content (wt %) | Atmosphere | Capacity (mAh/g)/ Charge and discharge efficiency | | |
|---|---|---|---|---|---|---|---|
| | | | | | EC/DMC/ DEC | EC/EMC/ DEC | EC/DMC/ DEC/PC |
| Example 10 | Agglo-master | 1.1 | 0.48 | Ar | 335/91.5 | 334/91.4 | 335/91.6 |
| Example 11 | Spray-dryer | 2.2 | 0.95 | Ar | 343/92.0 | 336/93.5 | 339/93.8 |
| Example 12 | Agglo-master | 1.1 | 0.36 | Air | 330/93.3 | 329/93.4 | 300/49 |
| Example 13 | Agglo-master | 2.2 | 0.86 | Air | 335/88.0 | 338/89.2 | 150/40 |
| Example 14 | Spray-dryer | 2.2 | 0.86 | Air | 328/94.1 | 325/94.0 | 260/52 |

TABLE 3

|  | Coating Equipment | Quantity of $B_2O_3$ (wt %) | B content (wt %) | Atmosphere | Capacity (mAh/g)/ Charge and discharge efficiency | | |
|---|---|---|---|---|---|---|---|
|  |  |  |  |  | EC/DMC/ DEC | EC/EMC/ DEC | EC/DMC/ DEC/PC |
| Example 15 | Spray-dryer | 1.1 | 0.51 | Air | 288/93.4 | 330/92.4 | 328/91.4 |
| Example 16 | Spray-dryer | 2.2 | 1.03 | Air | 295/93.2 | 296/93.5 | 297/89.5 |

As shown in Tables 1 to 3, it turned out that propylene carbonate (PC) be effectively used for the electrolyte solvent in combination with the boron-containing negative electrode without any dropping in the cell performance characteristics.

EXAMPLE 17

$H_3BO_3$ was mixed with pitch. The mixture was heat-treated at about 450° C. to obtain a coke type material. The resulting material was carbonized at about 1000° C. The carbonized material was then graphitized at 2600° C. above for two hours or more under an air atmosphere to thereby obtain a boron-doped graphite material.

An active material slurry for the negative electrode was prepared by mixing the boron-doped graphite material identified above, polyvinylidene fluoride (PVDF) for a binder and N-methylpyrrolidone for a solvent. The weight percent ratio of the boron-doped graphite material to PVDF was 90 to 10. The slurry was coated onto a copper foil for a current collector, dried and pressed thereon to thereby prepare the negative electrode. A thin foil of metallic lithium was used as the opposite pole to the negative electrode. Three kinds of electrolytes were prepared by dissolving $LiPF_6$ in a mixture of ethylene carbonate (EC), dimethyl carbonate (DMC) and diethyl carbonate (DEC), a mixture of EC, ethyl methyl carbonate (EMC) and DEC, and a mixture of EC, DMC, DEC and propylene carbonate (PC). Coin-type half cells were fabricated with the above cell components.

that $B_2O_3$ was replaced by $B_4C$ and $B_4C$ was first mixed with resin instead of pitch. Coin-type half cells were fabricated with the resulting negative electrode in combination with other components as described in Example 17.

COMPARATIVE EXAMPLE 1

The negative electrode preparing procedure was performed in the same way as in Example 17 with the exception that $H_3BO_3$ and other carbonaceous materials were absent and the graphitizing step was performed Is at about 2700° C. under an argon atmosphere. Coin-type half cells were fabricated with the resulting negative electrode in combination with other components as described in Example 17.

The coin-type half cells prepared according to Examples 17 to 19 and Comparative Example 1 were charged and discharged at 0.2C. Thereafter, the capacity and the charge/discharge efficiency of each cell was tested and evaluated. The results were exhibited in Table 4. The boron content was measured by ICP-Mass, and the surface-structure as well as the micro-structure of the negative electrode was identified by TEM, XPS, Raman Spectroscopy and XRD analysis.

TABLE 4

|  | Quantity of carbonaceous material (wt %) | B content (wt %) | Atmosphere | Capacity (mAh/g)/ Charge and discharge efficiency | | |
|---|---|---|---|---|---|---|
|  |  |  |  | EC/DMC/ DEC | EC/EMC/ DEC | EC/DMC/ DEC/PC |
| Example 17 | 3 | 0.75 | Air | 332/92.6 | 330/92.4 | 328/91.4 |
| Example 18 | 4.2 | 2.5 | Air | 336/89.5 | 334/88.5 | 337/90.0 |
| Example 19 | 4.5 | 2.6 | Air | 305/84.2 | 304/83.5 | 306/83.6 |
| Compara-Example 1 | 0 | 0 | Ar | 295/89.5 | 298/89.6 | 150/48 |

EXAMPLE 18

Pitch coke was prepared by heat-treating pitch at about 450° C. $B_2O_3$ was first mixed with pitch and the mixture was then uniformly re-mixed with the pitch coke. The mixture was carbonized at about 1000° C. The carbonized material was then graphitized at 2600° C. above for two hours or more under an air atmosphere to thereby obtain a boron-doped graphite material.

A negative electrode was prepared with the boron-doped graphite material and coin-type half cells were fabricated with the negative electrode in the same way as in Example 17.

EXAMPLE 19

The negative electrode preparing procedure was performed in the same way as in Example 18 with the exception As shown in Table 4, it turned out that propylene carbonate (PC) be effectively used for the electrolyte solvent in combination with the boron-containing negative electrode without any dropping in the cell performance characteristics. In contrast, when PC as the electrolyte solvent is applied to the cell using the negative electrode having no boron component, the cell performance characteristics were seriously deteriorated.

EXAMPLE 20

An organic solvent was made by mixing ethylene carbonate (EC), dimethyl carbonate (DMC) and propylene carbonate (PC) at a ratio 45:45:10 by volume. Thereafter, an electrolyte was prepared by dissolving $LiPF_6$ in the organic solvent. A positive active material slurry was prepared by mixing 94 weight percent of $LiCoO_2$, 3 weight percent of polyvinylidene fluoride (PVDF) for a binder and 3 weight percent of carbon black for a conductive agent, together with N-methylpyrrolidone for a solvent. The slurry was then coated onto a aluminum foil for a current collector, dried and pressed thereon to thereby prepare a positive electrode. Thereafter, a 18650 full cell (total capacity of 1650 mAh) was fabricated by using the positive electrode, the electrolyte and the negative electrode prepared according to Example 1.

EXAMPLE 21

The positive electrode preparing procedure was performed in the same way as in Example 20 with the exception that the organic solvent was made by mixing ethylene carbonate (EC), dimethyl carbonate (DMC) and diethyl carbonate (DEC) at a ratio 3:3:1 by volume. A full cell was fabricated with the resulting positive electrode in combination with other components as described in Example 20.

The full cells prepared according to Examples 20 and 21 were charged at 1C by 4.1V and discharged at 1C by 2.75V. The capacity per cycle of each cell was tested and evaluated. The results were exhibited in FIG. 1. As shown in FIG. 1, the cell using PC as the electrolyte solvent (Example 20) was less in capacity loss per cycling than the cell not using PC as the electrolyte solvent (Example 21).

EXAMPLES 22 TO 31 AND CONTROL 1

The coin-type half cell preparing procedure was performed in the same way as in Example 1 with the exception that the mixture ratio of the organic solvent varied as shown in Table 5.

The coin-type half cells prepared according to Examples 22 to 31 and Control 1 were charged and discharged at 0.2C. The capacity and the charge/discharge efficiency of each cell was tested and evaluated. The results were exhibited in Table 5.

TABLE 5

|  | Electrolyte | Composition | Capacity (mAh/g) | Charge and discharge Efficiency (%) |
|---|---|---|---|---|
| Example 22 | EC/EMC/DEC/PC | 41/25/24/10 | 337 | 90.5 |
| Example 23 | EC/EMC/DEC/PC | 46/29/20/5 | 338 | 90.8 |
| Example 24 | EC/DMC/DEC/PC | 41/39/10/10 | 338 | 91.0 |
| Example 25 | EC/EMC/DMC/PC | 46/29/20/5 | 338 | 90.9 |
| Example 26 | EC/EMC/DMC/PC | 41/25/24/10 | 341 | 91.0 |
| Example 27 | EC/DMC/PC | 50/40/10 | 336 | 91.1 |
| Example 28 | EC/DMC/PC | 45/40/15 | 338 | 90.9 |
| Example 29 | EC/EMC/PC | 41/49/10 | 340 | 90.9 |
| Example 30 | EC/EMC/PC | 40/47/13 | 338 | 90.4 |
| Example 31 | EC/EMC/DEC | 51/19/30 | 339 | 91.0 |
| Control 1 | EC/propyl acetate/DEC | 51/10/39 | 339 | 90.0 |

As shown in Table 5, it turned out that propylene carbonate (PC) be effectively used for the electrolyte solvent in combination with the boron-containing negative electrode without any dropping in the cell performance characteristics.

EXAMPLE 32

An organic solvent was made by mixing ethylene carbonate (EC), dimethyl carbonate (DMC), diethyl carbonate (DEC) and propylene carbonate (PC) at a ratio 39:37:12:12 by volume. Thereafter, an electrolyte was prepared by dissolving $LiPF_6$ in the organic solvent. A positive active material slurry was prepared by mixing 94 weight percent of $LiCoO_2$, 3 weight percent of polyvinylidene fluoride (PVDF) for a binder and 3 weight percent of carbon black for a conductive agent, together with N-methylpyrrolidone for a solvent. The slurry was then coated onto a aluminum foil for a current collector, dried and pressed thereon to thereby prepare a positive electrode. Thereafter, a 18650 full cell was fabricated by using the positive electrode, the electrolyte and the negative electrode prepared according to Example 17.

EXAMPLE 33

The full cell preparing procedure was performed in the same way as in Example 32 with the exception that the negative electrode prepared according to Example 18 was used instead of the negative electrode prepared according to Example 17.

EXAMPLE 34

The full cell preparing procedure was performed in the same way as in Example 32 with the exception that the negative electrode prepared according to Example 19 was used instead of the negative electrode prepared according to Example 17.

COMPARATIVE EXAMPLE 2

An organic solvent was made by mixing ethylene carbonate (EC), dimethyl carbonate (DMC) and diethyl carbonate (DEC) at a ratio 3:3:1 by volume. Thereafter, an electrolyte was prepared by dissolving $LiPF_6$ in the organic solvent. A positive active material slurry was prepared by mixing 94 weight percent of $LiCO_2$, 3 weight percent of polyvinylidene fluoride (PVDF) for a binder and 3 weight percent of carbon black for a conductive agent, together with N-methylpyrrolidone for a solvent. The slurry was then coated onto a aluminum foil for a current collector, dried and pressed thereon to thereby prepare a positive electrode. Thereafter, a 18650 full cell was fabricated by using the positive electrode, the electrolyte and the negative electrode prepared according to Comparative Example 1.

COMPARATIVE EXAMPLE 3

The full cell preparing procedure was performed in the same way as in Comparative Example 2 with the exception that the electrolyte organic solvent was made by mixing ethylene carbonate (EC), dimethyl carbonate (DMC) and propylene carbonate (PC) at a ratio of 45:45:10 by volume.

COMPARATIVE EXAMPLE 4

The full cell preparing procedure was performed in the same way as in Comparative Example 2 with the exception that the electrolyte organic solvent was made by mixing ethylene carbonate (EC), dimethyl carbonate (DMC), diethyl carbonate (DEC) and propylene carbonate (PC) at a ratio of 39:37:12:12 by volume.

Figure 2:
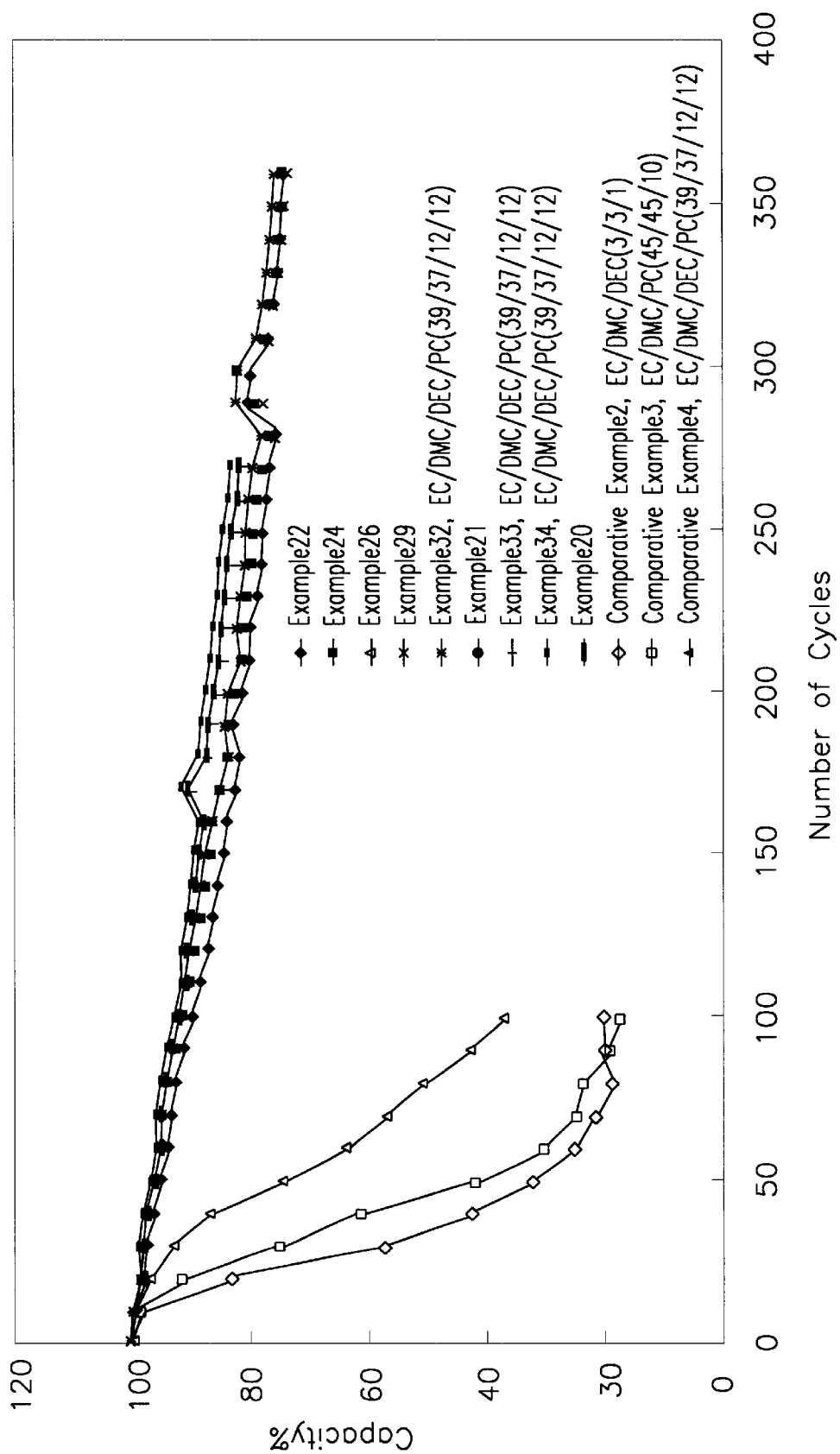
FIG. 2 is a graph illustrating battery capacity contrasted to the initial value during charge and discharge cycles of rechargeable lithium batteries according to other examples of the present invention and comparative examples.

The full cells prepared according to Examples 20, 21, 22, 24, 26, 29, 32, 33 and 34, and Comparative Examples 2 to 4 were charged at IC by 4.1V and discharged at 1C by 2.75V. The capacity per cycle of each cell was tested and evaluated. The results were exhibited in FIG. 2. As shown in FIG. 2, the cell using PC as the electrolyte solvent (Examples) was less in capacity loss per cycling than the cell not using PC as the electrolyte solvent (Comparative Examples).

As described above, the inventive rechargeable lithium battery reveals good battery performance characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A rechargeable lithium battery comprising:
   a negative electrode containing a graphite-based active material with boron as a donor prepared by mixing a boron-based compound solution with coke such that the boron-based compound is uniformly coated on the coke surface, carbonizing and graphitizing the mixture wherein said boron doped in the graphite-based active material is ranged from 0.1 to 5 weight percent;
   a positive electrode containing a transition metal oxide-based active material;
   a separator interposed between the negative and positive electrodes; and
   an electrolyte immersed into the positive and negative electrodes and the separator, the electrolyte containing at least 51 percent by volume of cyclic carbonate and chain carbonate, wherein the at least 51 percent by volume includes from 5 percent to 15 percent by volume propylene carbonate.

2. The rechargeable lithium battery of claim 1 wherein boron is processed from a source selected from the group consisting of $B_4C$, $B_2O_3$ and $H_3BO_3$.

3. The rechargeable lithium battery of claim 1 wherein the boron doped graphite-based active material has an X-ray diffraction intensity ratio I(110)/I(002) of 0.04 or less.

4. The rechargeable lithium battery of claim 1 wherein the boron doped graphite-based active material is formed with a crystalline-graphitic structured core exhibiting a Raman Spectroscopy intensity ratio I(1360)/I(1580) of about 0.3 or less, and a turbo-stratic structured carbon surface exhibiting a Raman Spectroscopy intensity ratio I(1360)/I(1580) of about 0.3 or less.

5. The rechargeable lithium battery of claim 1 wherein the boron doped graphite-based active material exhibits an exothermic peak at about 900° C. or more at a time varying analysis.

6. The rechargeable lithium battery of claim 1 wherein the chain carbonate is selected from the group consisting of dimethyl carbonate, ethyl methyl carbonate, diethyl carbonate and a mixture thereof.

* * * * *